(12) United States Patent
Aalto et al.

(10) Patent No.: US 6,183,647 B1
(45) Date of Patent: Feb. 6, 2001

(54) METHOD AND APPARATUS FOR TREATMENT OF LIQUID

(76) Inventors: Kari Aalto, Pihlajakatu 24, FIN-33900 Tampere (FI); Valery Antipov, ul. Yuny, 9, Simferopol, 333017; Alexander Melnikov, Apt. 134, Gerovev Stalingrada Street, Simferopol, 333640, both of (UA); Michail Ivanovich Sotov, St. Koroleva 19-58, Obninak, Mosko reg (RU)

(*) Notice: Under 35 U.S.C. 154(b), the term of this patent shall be extended for 0 days.

(21) Appl. No.: 09/331,440

(22) PCT Filed: Dec. 11, 1997

(86) PCT No.: PCT/FI97/00776

§ 371 Date: Jun. 22, 1999

§ 102(e) Date: Jun. 22, 1999

(87) PCT Pub. No.: WO98/29176

PCT Pub. Date: Jul. 9, 1998

(30) Foreign Application Priority Data

Dec. 30, 1996 (FI) .......................................... 965249

(51) Int. Cl.[7] .................................................. B01D 65/02
(52) U.S. Cl. ............. 210/636; 210/321.69; 210/321.87; 210/490; 210/650; 216/56
(58) Field of Search .................. 210/321.69, 321.84, 210/321.86, 321.87, 323.2, 490, 636, 108, 257.2, 411, 433.1, 650; 216/56

(56) References Cited

U.S. PATENT DOCUMENTS 3,853,756 * 12/1974 Stana ...................................... 210/636
4,264,445   4/1981 Lumikko et al. ..................... 26/323.2
4,980,066 * 12/1990 Slegers ................................... 210/636
5,262,053 * 11/1993 Meier ..................................... 210/636
5,904,846 *  5/1999 Clements et al. ................ 210/321.86

FOREIGN PATENT DOCUMENTS 1 436 302   11/1968 (DE) .
0 531 817    8/1992 (EP) .
5-177185     7/1993 (JP) .

* cited by examiner

*Primary Examiner*—Joseph W. Drodge
(74) *Attorney, Agent, or Firm*—Pollock, Vande Sande & Amernick

(57) ABSTRACT

The invention relates to a method for treatment of liquid, that is meant particularly for filtering of pressurized liquid, such as water led from a water distribution system, by way of an apparatus, which has an essentially closed frame (1), in connection with which there has been arranged at least a filtering device (2) for purifying of liquid and a flow device (3), such as feed-flow and/or exhaust flow arrangements (3a, 3b) for leading of liquid. The filtering device (2) is made of thin filtering film (2a), advantageously made of plastic based material, such as PTM (Particle Track Membrane), TeM (Track-etch Membrane) or like, the thickness of which is preferably 7–25 μm and the size of pores of which is 0.05–10 μm. The filtering film (2a) belonging to a filtering device (2) are being purified essentially self-powered, such as by way of a purification device (5) exploiting the pressure (p) or the movement (v1) of the liquid to be treated and/or the liquid that has been treated. The invention relates to an apparatus operating according to the method as well.

18 Claims, 4 Drawing Sheets

METHOD AND APPARATUS FOR TREATMENT OF LIQUID

This Application is a 371 of International Application PCT/FI97/00776, filed on Dec. 11, 1997

FIELD OF THE INVENTION

The invention relates to a method for treatment of liquid, that is meant particularly for filtering of pressurized liquid, such as water led from a water distribution system or like, by means of an apparatus, which has an essentially closed body, in connection with which there has been arranged at least filtering means for purifying of liquid and flow means, such as feed-flow and/or exhaust-flow arrangements for leading of liquid. The filtering means are made of thin filtering film, preferably made of plastic based material, such as PTM (Particle Track Membrane), TeM (Track-etch Membrane) or like, the thickness of which is preferably 7–25 $\mu$m and the size of pores of which is 0.05–10 $\mu$m, whereby in connection with the body there has been arranged preferably a support arrangement to support the filtering film. The filtering means are purified by means of purification means.

BACKGROUND OF THE INVENTION

Finnish patent application 944287 discloses the type of water purification device described above comprising a membrane-structured filtering part. The solution in question is meant to operate by so called syphon principle, thanks to which the structure of the same is very simple. The water purification device in question is very safe and easy to use in practice, because the quality of the water flowing to the collecting point thanks to the syphon phenomenon being self-powered is continually homogeneous regardless of the operating time of the device. This is first of all based on the fact that a water purification device equipped with a thin PTM- or TeM-filtering film does not at any stage let through material parts exceeding a certain particle size, in which case, when the filtering film gets dirty, only the penetration speed of the filter decreases and may even totally be interrupted, in case the filtering film is not cleaned every now and then.

The device described above is very useful in most heterogeneous connections, e.g. in terrain for filtering of lake water or under other circumstances as well, wherein actual tap water may not be used. One disadvantage of the device is mainly the slowness of the filtering speed and on the other hand also the fact, that e.g. in ordinary household use the device requires use of separate vessels, so that functioning of the syphon phenomen could be brought out. In practice, cleaning of the filtering film of the device in question is disadvantageous to a certain extent as well, because it must be carried out first of all manually as a totally separate stage of operation. Manual cleaning of the filtering film is on the other hand disadvantageous in such respect as well, that during mechanical rubbing by too "heavy-handed" treatment the pores in the filtering film may get enlarged unintentionally or on the other hand they may get stuffed up by impurities. This is why, functioning of the filtering film of a device being used under particularly dirty circumstances, may weaken too much immediately after the first cleaning measure due to decreased penetration ability. A crucial disadvantage involved with the type of apparatus in question may be in practice, however, the fact, that it is not possible to exploit the same as such very simply, e.g. for filtering of water being led directly from a water distribution system, but instead separate water vessels must be used because of the syphon principle.

On the other hand from e.g. Japanese application 5-177 185 it is known to exploit a membrane-structured filtering device, that is placed to a basin comprising liquid to be treated. The solution in question is thus meant for large-scale use, but in principle a corresponding type of solution may be placed e.g. directly at the end of a supply pipe as well. In the solution in question the filtering means are brought out by a so called bag filter principle in a way, that liquid to be treated goes through the walls of the elongated membrane pipes to the secondary side of the filter keeping clean water and furthermore for some utility purpose through a flow-way being connected to this side. The solution in question is advantageous in such respect, that for purifying of the filtering means there has been exploited an inverse flushing flow, in which case at the secondary side of the filter there has been placed a supplementary container keeping filtered water. In this case, when running of water is interrupted, a pump is being used, which feeds the filtered water from the supplementary container as an inverse flow through the filtering pipes, whereby the same get purified.

The arrangement in question is advantageous in such respect, that the porous structures of the filtering pipework may be flushed by means of an inverse flow. In practice, the type of elongated, flexible pipe structures as described above collect, however, impurities particularly to the outer surfaces of the same, that is why e.g. bacteria growth may get collected to the same, that may not be, however, influenced directly by means of the type of inverse flow described above. This is why the flushing principle in question operates only partly. In addition to that, the type of solution has such a disadvantage as well, that the filtering pipework is a very confused entirety, that is why it is not possible to get any kind of sight inside the same, in which case e.g. fungus or some other corresponding undesired bacteria formulation being generated therewith may not be noticed. The solution in question is on the other hand disadvantageous in such respect as well, that a separate pump must be used for the purification flushing, which requires a very complicated control and adjustment automation and instrumentation. This for its part makes use of the device more difficult and decreases efficiency of the same decisively in practice as well.

Thus, nowadays there are not any water purifiers or like on the market, that would be profitable enough by the acquisition or functional costs and that would be technically easy to utilize e.g. for household use and, that would operate effectively enough and eliminate particularly bacteria under all kinds of circumstances reliably enough.

SUMMARY OF THE INVENTION

It is an aim of the method according to the invention to achieve a decisive improvement in the problems presented above and thus to raise substantially the level of prior techniques. To achieve this aim, the method is primarily characterized in, that the filtering film belonging to the filtering means are being purified essentially self-powered, such as by means of purification means exploiting the pressure, the movement and/or like of the liquid to be treated and/or the liquid that has been treated.

As the most important advantages of the method according to the invention may be mentioned the simplify and reliability of the construction and use of the same, which matters are crucial requirements for achievement of reliable purifying result particularly when the aim is to produce e.g.

drinking water under most heterogeneous circumstances. Thanks to the simple principle of the method, manufacturing of the apparatus to be exploited therewith is advantageous as well, in addition to which the method is also profitable thanks to continuous functioning of the same, because the filtering film belonging to the same may be purified extremely simply, fast and reliably. In addition to that one crucial advantage of the method is also the fact, that manual purification measures are not needed any more, so that no direct mechanical rubbing of the filtering film may not occur. Thanks to the method, the filtering film may get effectively flushed first of all throughout the entire outer surface of the same by exploiting a by-pass flow of not yet treated water and on the other hand also as an advantageous embodiment due to the inverse flow of the treated liquid, that is e.g. filtered water, that takes place through the perforation. Thanks to the method, the quality of the produced liquid is always homogeneous, because the filtering film, that remains undamaged and effectively clean, does not at any stage penetrate material parts exceeding a certain particle size.

The invention relates also to an apparatus to be exploited within the method. The apparatus is defined in more detail below.

As the most important advantages of the apparatus according to the invention may be mentioned the simplicity and the reliability of the construction and use of the same, whereby the apparatus may be exploited very simply e.g. all the way from ordinary house-hold use for most heterogeneous circumstances e.g. for purifying of water being led directly from a water distribution system. One crucial advantage of the apparatus according to the invention is the fact, that the filtering film may be fully reliably flushed by means of a by-pass flow taking place on one side of the same. In addition to that, the filtering film may be flushed effectively by means of an inverse flow as well taking place through the same, in which connection advantageously ejector principle is furthermore being exploited for sucking of filtered water from an intermediate container placed on the clean water side. A crucial advantage of the apparatus according to the invention is first of all the fact, that sanitation of the filtering film does not require any manual measures, that means e.g. direct rubbing of the same, but instead all measures related to the same may be carried out by the flows being described above without opening the apparatus. The apparatus according to the invention may be formed as a very compact structure, that may be exploited on very simple principles and in very many ways, e.g. directly at the end of the supply pipe or e.g. so to say below the kitchen sink in a way, that only the pipe leading the filtered water as well as e.g. a lever arrangement, by means of which a valve arrangement, that adjusts flows of the apparatus, may be controlled desireably to achieve the functioning desired at each time, must be placed on view, only. The apparatus is very profitable to manufacture, thanks to which also acquisition costs of the same are moderate.

BRIEF DESCRIPTION OF THE DRAWINGS

The invention will now be described in detail with reference made to the accompanying figures, in which.

DETAILED DESCRIPTION OF THE INVENTION

Figure 1:
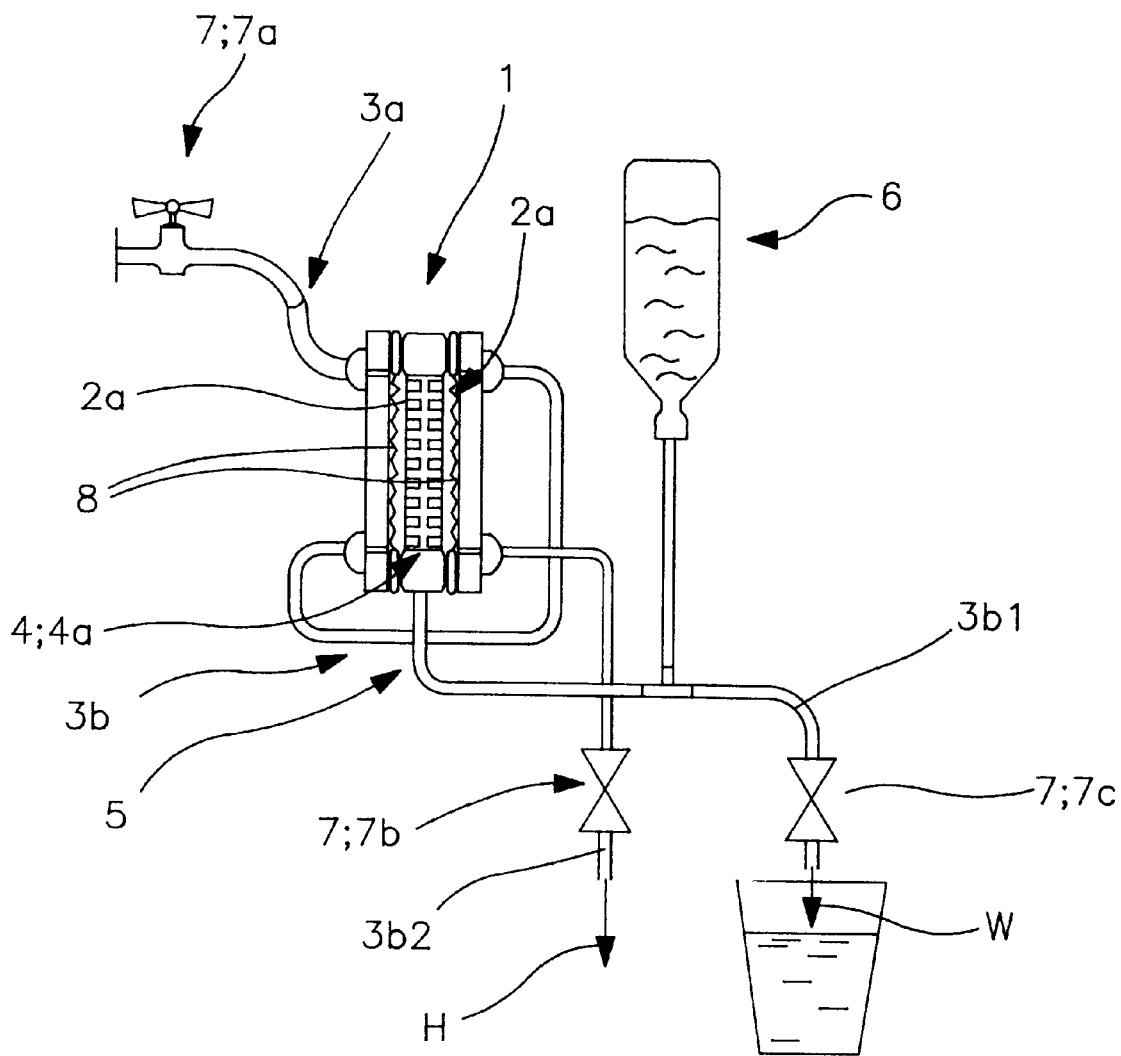
FIG. 1 shows one advantageous operating principle of the method according to the invention.
Figure 2:
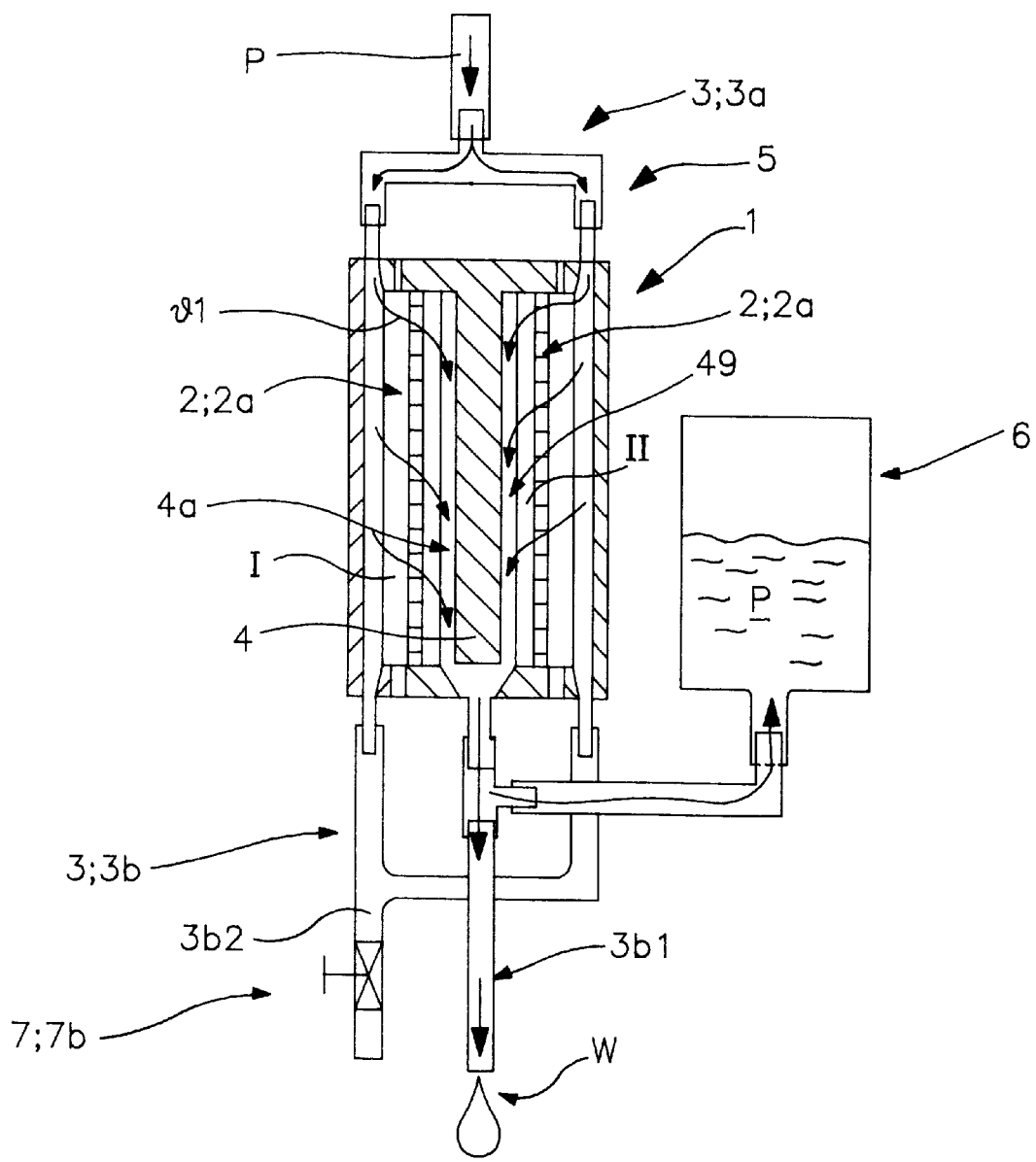
FIG. 2 shows an advantageous operating principle of an apparatus exploiting the method according to the invention during a filtration situation.

The invention relates to a method for treatment of liquid, that is meant particularly for filtering of pressurized liquid, such as water led from a water distribution system or like, by means of an apparatus, which has an essentially closed body 1, in connection with which there has been arranged at least filtering means 2 for purifying of liquid and flow means 3, such as feed-flow and/or exhaust-flow arrangements 3a, 3b for leading of liquid. The filtering means 2 are made of thin filtering film 2a, preferably made of plastic based material, such as PTM (Particle Track Membrane), TeM (Track-etch Membrane) or like, the thickness of which is preferably 7–25 $\mu$m and the size of pores of which is 0.05–10 $\mu$m in this context. In connection with the body 1 there has been arranged preferably also a support arrangement 4 to support the filtering film 2a. The filtering means 2a are being purified by means of purification means, whereby the filtering film 2a belonging to the same is being purified advantageously according to the principle as shown in FIGS. 1–3 essentially self-powered, such as by means of purification means 5 exploiting the pressure p, the movement v1 and/or like of the liquid to be treated and/or the liquid that has been treated.

Figure 3:
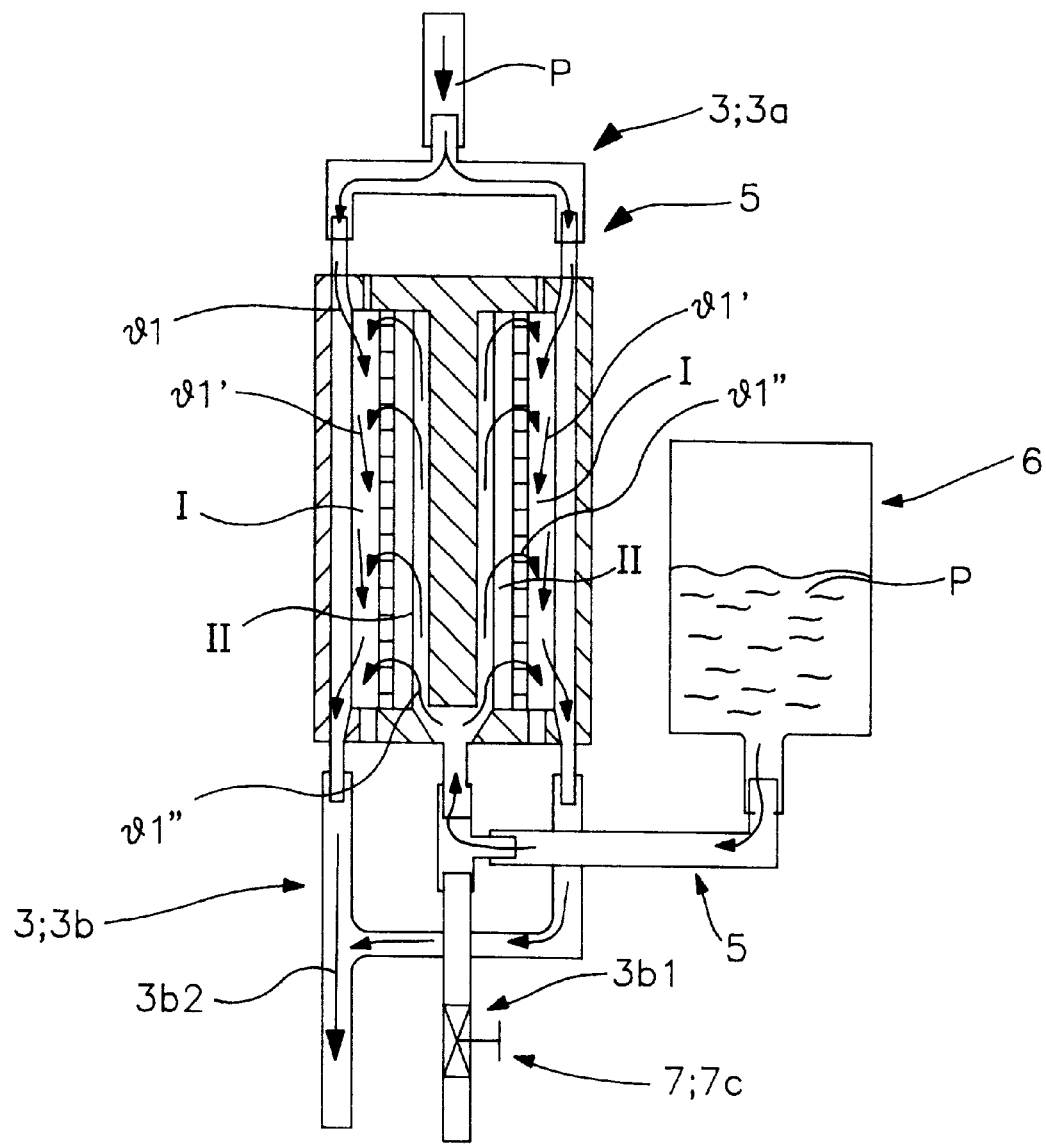
FIG. 3 shows functioning of the embodiment shown in FIG. 2 during a flushing situation.

With reference particularly to the flushing flow view shown in FIG. 3, the primary side I of one or several filtering films 2a belonging to the filtering means 2 is being flushed by means of a by-pass flow v1' carried out by the liquid to be treated passing the same essentially tangentially. With reference to the corresponding view in addition to that for purifying of the filtering means 2 on the other hand a so called inverse flow is being exploited as well, by leading treated liquid, such as filtered water, from an intermediate storing space 6, that is connected preferably to the secondary side II of the filtering means 2, through the filtering means 2 as a flow-through taking place to the opposite direction in respect to the filtration flow. In this case, the flushing flow v1" to the opposite direction is achieved by means of so called ejector principle, whereby liquid is being sucked from the intermediate storing space 6 by means of ejector influence caused by the by-pass flow v1' taking place on the primary side I of the filtering means 2, such as of one or several filtering films 2a.

By the actions described above, first of all a turbulent flow v1' is achieved, that flushes throughout the primary side I of the filtering film 1, and in addition to the above on the other hand flushing of the holes of the filtering film 2a effectively throughout the whole surface of the same is achieved as well by means of the inverse flow v1" carried out by ejector principle.

For example, a PTM/TeM-filtering film 2a is advantageously being used in the apparatus, that has been produced e.g. by irradiating and etching a basic plastic sheet. By using a relatively thin filtering film as described above the pressure loss caused by the filtering means may be effectively minimized, in which case the method according to the invention operates effectively enough and, however, fully reliably under all circumstances thanks to preventing of penetration of bacteria. The flow-through of an apparatus exploiting the method according to the invention is thanks to the film described above many times greater when compared to a ceramic purifier, that is e.g. more disadvantageous by the manufacturing costs of the same as well, or when compared to the type of "bag" filter being described in the beginning, in connection with which it is also not possible to exploit flushing arrangements functioning as effectively. The surface of the filtering film being exploited in the apparatus according to the invention is idealistically uniform overall, thanks to which generation of e.g. bacteria growth on the surface of the same is efficiently prevented.

An apparatus functioning according to the type of method described above includes thus an essentially closed body 1 to enable treatment of pressurized. liquid, filtering means 2 for purifying of liquid, flow means 3, that means feed-flow and/or exhaus-flow arrangements 3a, 3b for leading of liquid to be treated and/or of liquid that has been purified already, that means e.g. water, that has been filtered from a water distribution system. For usual purposes the thickness of e.g. a PTM- or TeM-structured filtering film may be advantageously between the above limits. As an advantageous embodiment a support arrangement 4 has been arranged furthermore to the body to support the filtering film 2a. As shown in FIGS. 1–4, the purification means 5 belonging to the apparatus are arranged to purify one or several filtering films 2a belonging to the filtering means 2 self-powered, that means e.g. by exploiting the pressure p, the movement v1 and/or like of the water to be filtered and/or the already filtered water.

With reference to the flushing flow view shown in FIG. 3, the purification means 5 are arranged to flush the primary side I of the filtering films 2a belonging to the filtering means by means of by-pass flows v1' of the liquid to be treated passing the same essentially tangentially. With reference to the corresponding view, flushing flows v1" to the opposite direction are exploited as well, that are arranged to operate by so called ejector principle, in which case the purification means 5 are carried out on the other hand by sucking filtered water from the intermediate storing space 6 by means of ejector influence caused by the by-pass flows v1' taking place on the primary side I of the filtering films 2a.

Figure 4:
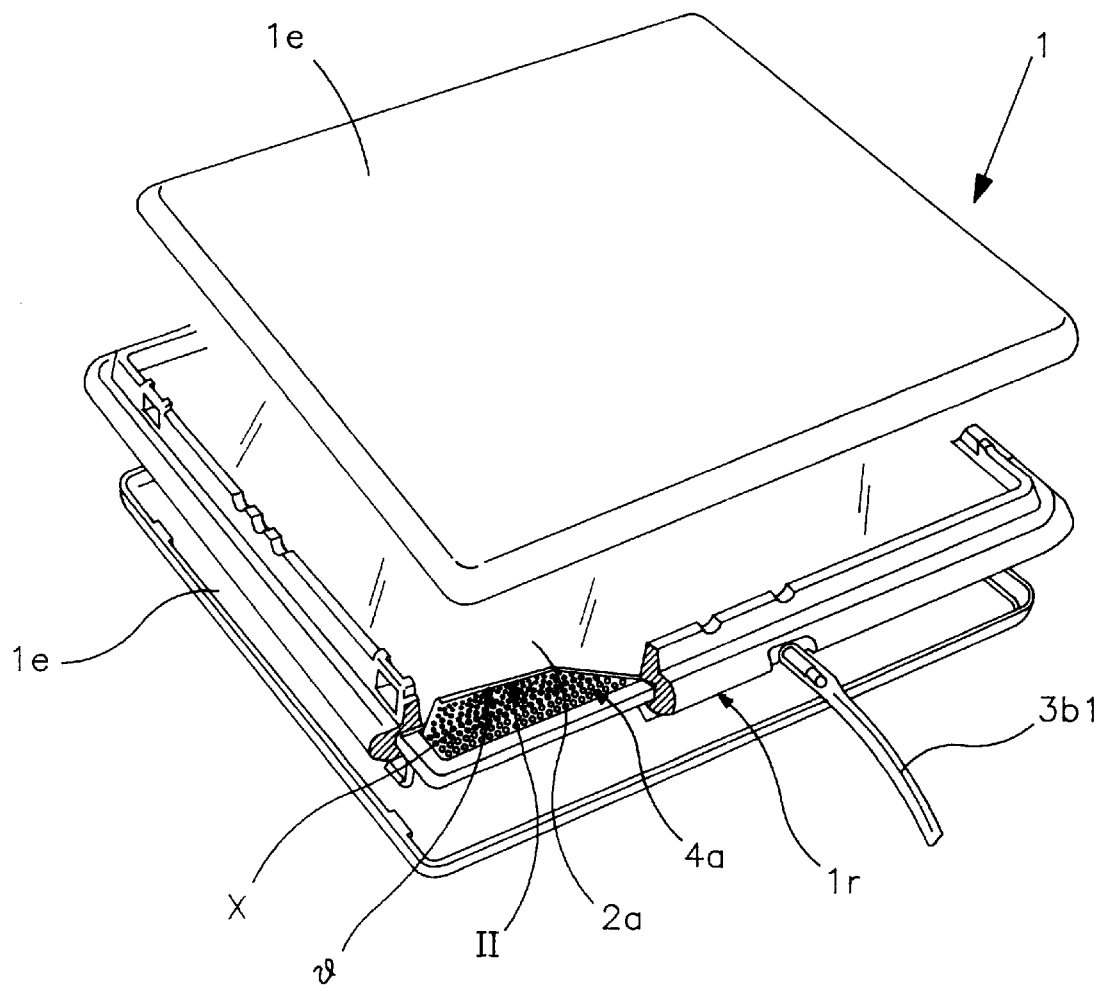
FIG. 4 shows an advantageous composition principle of an advantageous apparatus according to the invention as a perspective view and an exploided view.

In all the shown views in connection with the body 1 there has been arranged advantageously at least two parallel filtering films 2a and support surfaces 4a, that are placed essentially uniformly against the above, whereby liquid, that has passed the filtering films 2a during the filtration flow, is arranged to be led out from the body 1 through spaces between the filtering films 2a and the support surfaces 4a via the exhaust flow joint 3b1. With reference particularly to FIG. 4, the support surfaces 4a have advantageously a surface patterning as well, such as a tuberculation x, grooving or like, to form the flow space in question. The by-pass flow v1' of the liquid to be treated passing by the filtering films 2a, is arranged by flows, that are distributed advantageously from the feed flow of the liquid to be treated by a series connection (FIG. 1) or by a parallel connection (FIGS. 2 and 3) along the sides of the filtering films 2a.

As an advantageous embodiment the apparatus is arranged as an essentially uniform entirety by arranging the flow means 3, the intermediate storing space 6 and/or a valve arrangement 7 for guiding the liquid flows essentially built-in to the same body 1.

Furthermore with reference to FIG. 1, to the primary space I surrounding the filtering means 2, such as one or several filtering means 2a, there has been arranged turbulence means 8, such as liquid flow retarders, blenders or like, to make the flushing impact of the by-pass flow v1' more effective.

Furthermore as an advantageous embodiment the valve arrangement 7 is arranged to carry out the flushing flow v1" to the opposite direction so to say automatically during interruption of the treated liquid flow v, that is to be exhausted from the apparatus, by decreasing essentially the pressure on the primary side I, whereby by influence of the feed pressure p effecting in the intermediate storing space 6, the content of the same carry out the flushing flow v1", when exiting through the flushing exhaust joint 3b2.

Regarding particularly the valve arrangement 7, the arrangement shown in FIG. 1 is based on the principle, that the valve 7a of the feed water pipe is being kept continuously open, which embodiment is thus applicable to be used e.g. hided below the counter before the mixer. In this case only, the supply pipe for the filtered water as well as a control panel, control levers or like of the valve arrangement 7 may be installed on the kitchen sink. When the apparatus is being used on the other hand e.g. directly at the end of the supply pipe or correspondingly in a way, that the supply water valve 7a is being closed every now and then, the latter automatic flushing flow operates always, when the feed water valve in question is being shut, as long as the exhaust flushing flow valve 7b is being kept open long enough thereafter, so that the final flush may be carried out, when the exhaust valve 7c of the filtered water is being kept shut. Depending on the running principle it is thus in principle possible to use more valves in the valve arrangement 7 or on the other hand in practice only one e.g. so called hydraulic check valve, which shuts and connects the needed flow joints at each time.

Furthermore as a particularly advantageous embodiment, the body 1 of the apparatus, that may be closed by cover parts 1e, and filtering films 2a placed at both opposite sides of the same are manufactured to form an integral entirety, by arranging to the composition in question advantageously by heat treatment, by such as injection molding or correspondingly, an edge assembly 1r, that closes together the edges of the body 1 and the filtering films 2a e.g. according to the principle shown in FIG. 4. Furthermore as an advantageous embodiment, the filtering films 2a are strengthened advantageously by laminating on at least one outer surface of the same, such as on the side facing the supporting surface 4a, a strengthening layer v preferably made of non-woven material.

It has been found, that the above constructions enable use of a bigger pore size in the filtering film 2a than particularly with more heterogeneous structures, which, however, may be most advantageously between 0.2 –0.6 $\mu$m. In this case the pore density is correspondingly preferably $5\times10^8$–$5\times10^7$ pieces/cm$^2$. Furthermore a plastic based material, preferably polyethylene/polyprophylene is being used as the strengthening layer v, the weight of which is 15–50 g/m$^2$.

It is obvious, that the invention is not limited to the embodiments presented or described above, but instead it can be modified to a great extent within the basic idea. So it is in principle possible to carry out the constructions relating to the apparatus according to the invention in very many ways, e.g. by using a structure having e.g. a circular cross section, which has e.g. a cylindrical filtering film. On the other hand, it is possible to exploit also the type of solutions shown in the enclosed drawings in differing ways, by using several filtering film units being placed e.g. parallelly, in series or on top of the other. Naturally, in addition to the PTM, TeM films possibly other kinds of films, that are suitable for this purpose may also be utilized. When utilizing e.g. the type of filtering film mentioned above, also a water permeable wall may naturally be used as the supporting surface, thus being formed of a net, grating or like. This kind of construction may not correspond to the embodiment represented above particularly in the sense of manufacturing costs, which is firstly due to that, that e.g. a metal constructed supporting frame may became rusty during use, and, when being made of material good enough or correspondingly of plastics become too expensive. It is naturally obvious, that also the pipe arrangements as well as the valve arrangements may be carried out in most heterogeneous ways depending on the fact, how and in what kind of connections the method and apparatus are being exploited. So the valve arrangement may be carried out by valves acting mechanically or by pressurized medium and/or in addition to the above also by exploiting electricity, in case bringing out e.g. of purification devices acting e.g. by the so called remote control principle is desired.

So the embodiments shown in the drawings represent mainly suggestive principles, in which case it is naturally obvious, that e.g. the intermediate storing space and/or the valve arrangement may be formed as a part entirety belonging more or less integrally to the body. In addition to that, many parts of the apparatus according to the invention may be produced by using most heterogeneous manufacturing techniques and materials, which has naturally certain influence to the appearance of the respective construction.

What is claimed is:

1. A method for treating liquid, the method comprising:
providing an apparatus comprising an essentially closed body, filtering means connected with the body for purifying liquid and comprising a filtering film defining a sandwich structure in which a secondary space for treated liquid is surrounded by a primary space for liquid to be treated, the filtering film comprising a particle track membrane or a track-etch membrane, the filtering film separating the treated liquid from the liquid to be treated, flow means connected with the body for introducing and removing liquid from the body, a support for supporting the filtering film, an intermediate storage space for storing filtered liquid downstream of the filtering means, and essentially self-powered purifying means for purifying the filtering means by cleaning the filtering film, whereby a primary side of the filtering film facing the primary space is flushed by a by-pass flow of the liquid to be treated passing the filtering film essentially tangentially; and
purifying the filtering means utilizing inverse flow by feeding treated liquid from the intermediate storage space through the filtering means in an opposite direction with respect to a filtration flow.

2. The method according to claim 1, wherein the liquid is pressurized liquid.

3. The method according to claim 1, wherein the liquid is water from a water distribution system.

4. The method according to claim 1, wherein the filtering means comprises at least one of a feed-flow or an exhaust-flow arrangements.

5. The method according to claim 1, wherein the thickness of the filtering film is 7–25 $\mu$m and includes pores having a size of 0.05–10 $\mu$m.

6. The method according to claim 1, wherein the treated liquid is filtered water.

7. The method according to claim 1, wherein the inverse flow is achieved at least partly by an ejector principle, whereby liquid is removed from the intermediate storage space by an ejector influence caused by the by-pass flow on the primary side of the filtering means.

8. The method according to claim 1, the inverse flow is carried out automatically by decreasing a pressure on the primary space during interruption of treated liquid flow, whereby by influence of a feed pressure affecting the intermediate storage space, the contents of the intermediate storage space carry out the flushing flow when exiting through a flushing exhaust joint.

9. An apparatus for treating liquid, comprising:
an essentially closed body;
filtering means connected with the body for purifying liquid, the filtering means comprising a filtering film defining a sandwich structure in which a secondary space for treated liquid is surrounded by a primary space for liquid to be treated, the filtering film comprising a particle track membrane or a track-etch membrane;
flow means connected with the body for introducing and removing liquid from the body;
a support for supporting the filtering film;
an intermediate storage space for storing filtered liquid downstream of the filtering means; and
purifying means for purifying the filtering means, the purifying means being arranged to flush a primary side of the filtering means facing the primary space by means of a by-pass flow of the liquid to be treated passing the filtering film essentially tangentially, the purifying means being arranged to purify the filtering means through inverse flow, the inverse flow comprising transferring treated liquid from the intermediate storage space through the filtering means in an opposite direction with respect to a filtration flow.

10. The apparatus according to claim 9, wherein the thickness of the filtering film is 7–25 $\mu$m and includes pores having a size of 0.05–10 $\mu$m.

11. The apparatus according to claim 9, wherein the inverse flow is achieved at least partly by an ejector principle, whereby liquid is removed from the intermediate storage space by an ejector influence caused by the by-pass flow on the primary side of the filtering means.

12. The apparatus according to claim 9, wherein the filtering means comprises two parallel filtering films in connection with the body of the apparatus, the apparatus further comprising two support surfaces placed essentially uniformly against the two filtering films, whereby liquid that has passed through the filtering films during filtration flow is arranged to be fed from the body through spaces between the filtering films and the support surfaces via an exhaust flow joint, and the by-pass flow is arranged by means of flows that are distributed from a feed flow of the liquid to be treated as a series or parallel connection.

13. The apparatus according to claim 12, wherein the support surfaces have a surface patterning that forms a flow space.

14. The apparatus according to claim 13, wherein the surface patternig comprises a tuberculation-or grooving.

15. The apparatus according to claim 9, wherein the apparatus comprises an essentially uniform entirety including the flow means, the intermediate storage space and/or a valve arrangement for guiding the liquid flows essentially built into the body.

16. The apparatus according to claim 9, further comprising:
turbulence creating means arranged in the primary space for increasing effectiveness of a flushing impact of the by-pass flow.

17. The apparatus according to claim 16, wherein the turbulence creating means comprises liquid flow retarders or blenders.

18. The apparatus according to claim 9, further comprising:
a valve arrangement arranged to automatically carry out the inverse flow during interruption of treated liquid flow, the inverse flow being exhausted from the apparatus by decreasing a pressure on the primary side, whereby feed pressure on the intermediate storage space causes contents of the intermediate storage space to flow out of the intermediate storage space through a flushing exhaust joint thereby creating the inverse flow.

* * * * *